May 30, 1933.  F. N. BARD  1,911,938
FLEXIBLE JOINT
Filed Aug. 3, 1931
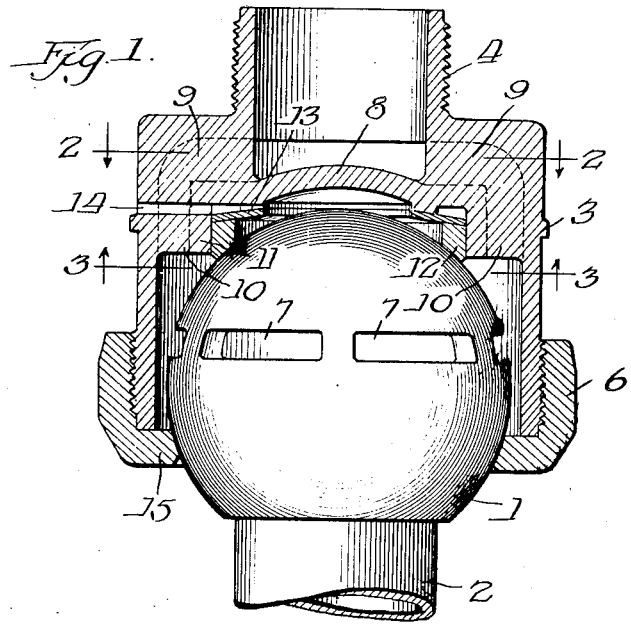
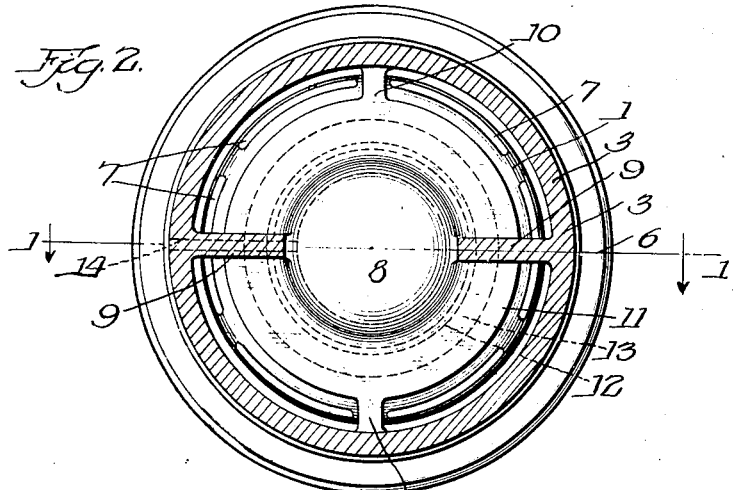
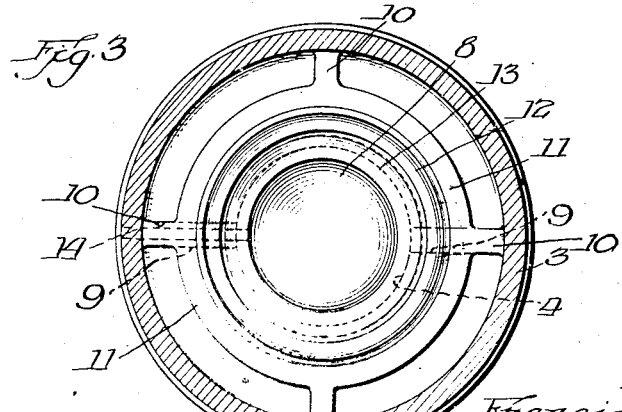
Inventor:
Francis Norwood Bard
By Wilson, Dowell, McCanna & Pelun
Attys Patented May 30, 1933

1,911,938

UNITED STATES PATENT OFFICE

FRANCIS NORWOOD BARD, OF HIGHLAND PARK, ILLINOIS, ASSIGNOR TO BARCO MANUFACTURING CO., OF CHICAGO, ILLINOIS, A CORPORATION OF ILLINOIS

FLEXIBLE JOINT

Application filed August 3, 1931. Serial No. 554,635.

This invention pertains to flexible joints of the ball and socket type and while particularly adapted to meet the severe service conditions of railroad use it is obviously suitable for other purposes as well.

A flexible joint of the ball and socket type customarily comprises a ball cored centrally to permit the flow of fluid therethrough, disposed in a suitably shaped socket in which it is retained by a cap member so as to permit rotative movement of the ball relatively to the socket and cap. The ball and socket members terminate respectively in a hose or pipe nipple by which the joint is connected in the steam or air pressure line. In service the line pressure tends to force the ball out of the socket in which it is retained by the cap thereby causing excessive friction between the ball and cap which interferes with easy flexing of the joint and results in wear and deterioration of the assembly.

My present invention aims to obviate to a large degree these objectionable characteristics inherent in ordinary ball joints, by substantially equalizing or balancing the thrust exerted upon the ball member by the line pressure thereby minimizing the pressure or thrust of the ball against the cap and correspondingly reducing the friction and wear.

In order to accomplish these desirable results the ball instead of being open at both ends is closed at that end opposite to the nipple and the exterior of the closed end is sealed against the line pressure and exposed to atmosphere. The line pressure exerted against the interior of this closed end therefore tends to thrust the ball into the socket rather than against the cap, as in prior joints, and thereby substantially balances the ball in the socket against the usual pressure between the ball and the cap. Openings in the sides of the ball communicating with passages in the socket member around the atmospheric pressure chamber at the closed end of the ball permit a free flow of fluid through the joint.

A more detailed understanding of my invention will be obtained from the following description when considered in connection with the drawing in which:

Fig. 1 is a central section on line 1—1 of Fig. 2 through a joint embodying the principles of this invention;

Fig. 2 is a transverse section taken on line 2—2 of Fig. 1; and

Fig. 3 is a transverse section taken on line 3—3 of Fig. 1 with the ball member removed.

In the drawing which illustrates one preferred embodiment of my invention, there is shown a flexible joint comprising a ball member 1 provided with a nipple 2 adapted for connection to a hose or other conduit. The ball is seated in a socket member 3 provided with a similar nipple 4 and is retained therein by a cap 6 threaded or otherwise secured over the open end of the socket.

For the purpose of equalizing the thrust upon the ball member created by the line pressure within the joint, the inner end of the ball, instead of being open as heretofore, is closed and the socket member, instead of having a central passage therethrough, is provided with a centrally disposed transverse wall 8 spaced from but in proximity to the outer surface of the closed end of the ball so as to provide an air chamber between the ball and the wall. Line pressure communication between the interior of the ball and the space within the socket member around the aforementioned air chamber is afforded through one or more passages 7 in the side walls of the ball.

The wall 8 is shown in the illustrated form of this invention, as formed integrally with the peripheral depending annular wall 11 of the air chamber. Radial ribs 10 carry the side wall 11 and top wall 8 of the chamber and strength and rigidity may be added to the structure by extending one or more of the ribs 10 upwardly as indicated by reference character 9.

The air chamber is sealed against the entrance of line pressure by any suitable seal between the wall 11 and the ball, and positioned either within or without the chamber. For illustrative purposes I have shown the seal in the form of an annular gasket 12 disposed within the chamber and shaped to snugly fit the curvature of the ball. The gasket may be urged into sealing contact with the ball by an annular spring 13 or other preferred type of spring.

The chamber surrounding the closed end of the ball is open to the atmosphere through a relief port 14 which may be drilled through one of the ribs 10. This port relieves any pressure which might otherwise tend to build up in this chamber in the event of leakage past the seal ring 12 and incidentally affords drainage for any liquid accidentally entering the chamber.

Suitable packing may be supplied within the lower end of the socket member around the ball, if necessary, to prevent leakage between the ball and the flange 15 of the ball retaining cap 6.

It will be apparent from the foregoing that by closing the end of the ball and sealing the outer surface of the closed end against line pressure, I have produced a substantially balanced joint in which the pressure or thrust against the ball retaining cap is minimized so as to increase the flexibility and longevity of the joint in service without increasing the liability of leakage.

Other novel features and their resultant advantages will be apparent to those skilled in the art and it should also be understood that various modifications of the structural details may be made without departing from the spirit and scope of this invention as defined in the appended claims.

I claim:

1. A flexible joint comprising a socket member and a ball member connected together so as to be capable of relative universal movements, said ball having an inlet through one side and being imperforate at the region diametrically opposite said inlet, said socket and ball having intercommunicating passages therethrough to permit the flow of fluid through the joint, and means for substantially balancing the line pressures upon said members, said means including a partition arranged to seal the outer surface of the closed end of said ball from line pressures.

2. A flexible joint comprising a socket member and a ball member connected together so as to be capable of relative universal movements, said ball having an inlet through one side and being imperforate at the region diametrically opposite said inlet, said socket and ball having intercommunicating passages therethrough to permit the flow of fluid through the joint, and means for substantially balancing the line pressures upon said members, said means including a partition arranged to seal the outer surface of the closed end of said ball from line pressures and a duct venting the chamber between said outer surface of the ball and said partition to the atmosphere.

3. A flexible joint comprising a socket member and a ball member connected together so as to be capable of relative universal movement, said ball having an inlet thereinto and being closed at its end opposite said inlet and being further provided with a passage therethrough leading into the interior of the socket to permit the flow of fluid through the ball and into the socket, said socket having a partition overlying the closed end of the ball to seal the exterior surface of the closed end of the ball from the line pressure of the fluid.

4. A flexible joint comprising a socket member and a ball member connected together so as to be capable of relative universal movement, said ball having an inlet thereinto and being closed at its end opposite said inlet and being further provided with a passage therethrough leading into the interior of the socket to permit the flow of fluid through the ball and into the socket, said socket having a partition overlying the closed end of the ball to seal the exterior surface of the closed end of the ball from the line pressure of the fluid, the space between said partition and ball being vented to atmosphere.

5. A flexible joint comprising a ball member and a socket member connected together so as to be capable of relative universal movement and provided with intercommunicating passages permitting a flow of fluid under pressure through the joint, said ball being closed upon one end and said socket being provided with a partition arranged to overlie the closed end of said ball and means for establishing a seal between said partition and the outer surface of said ball whereby the pressure thrusts upon said members are substantially equalized.

6. A flexible joint comprising a ball member and a socket member connected together so as to be capable of relative universal movement and provided with intercommunicating passages permitting a flow of fluid under pressure through the joint, said ball being closed upon one end and said socket being provided with a partition arranged to overlie the closed end of said ball, means for effecting a seal between said partition and the outer surface of said ball whereby the pressure thrusts upon said members are substantially equalized, and means for venting the chamber between said partition and the closed end of said ball to the atmosphere.

7. A flexible joint comprising a socket member and a ball member connected together so as to be capable of relative universal movements, said ball having an inlet through one side and being imperforate at the region diametrically opposite said inlet, said socket and ball having intercommunicating passages therethrough to permit the flow of fluid through the joint, and means for sealing the outer surface of the closed end of the ball from line pressures thereby substantially balancing the line pressures upon said members.

8. A flexible joint comprising a ball member and a socket member connected together so as to be capable of relative universal movement, said socket member being provided with a fluid opening, said ball also being provided with a fluid opening and a passage establishing communication between said openings to permit flow through said joint, and means for substantially balancing the line pressure thrust upon said ball member including a seal for relieving the pressure of the fluid passing through the joint from that portion of the outer surface of said ball disposed opposite to the fluid opening thereinto.

In witness of the foregoing I affix my signature.

FRANCIS NORWOOD BARD.